(12) United States Patent
Hakola et al.

(10) Patent No.: US 12,695,570 B2
(45) Date of Patent: Jul. 28, 2026

(54) DYNAMIC UPLINK TRANSMISSION SCHEME INDICATION FOR MULTI-PANEL USER EQUIPMENT

(71) Applicant: Nokia Technologies Oy, Espoo (FI)

(72) Inventors: Sami-Jukka Hakola, Oulu (FI); Timo Koskela, Oulu (FI); Juha Pekka Karjalainen, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 387 days.

(21) Appl. No.: 18/454,370

(22) Filed: Aug. 23, 2023

(65) Prior Publication Data

US 2024/0072968 A1      Feb. 29, 2024

Related U.S. Application Data

(60) Provisional application No. 63/400,621, filed on Aug. 24, 2022.

(51) Int. Cl.
*H04L 5/00* (2006.01)
*H04W 72/1268* (2023.01)
*H04W 72/232* (2023.01)

(52) U.S. Cl.
CPC ....... *H04L 5/0051* (2013.01); *H04W 72/1268* (2013.01); *H04W 72/232* (2023.01)

(58) Field of Classification Search
CPC ................ H04B 7/0404; H04B 7/0628; H04B 7/06956; H04L 5/0012; H04L 5/0023;

H04L 5/0051; H04L 5/0053; H04L 5/0091; H04L 5/0094; H04W 72/1268; H04W 72/23; H04W 72/232; H04W 72/51

See application file for complete search history.

(56) References Cited

U.S. PATENT DOCUMENTS 12,355,698 B2 * 7/2025 Muruganathan ...... H04L 5/0091
12,356,393 B2 * 7/2025 Huang ................... H04L 5/0053
(Continued)

FOREIGN PATENT DOCUMENTS

CN        113825235 A      12/2021
CN        115314176 B  *   9/2024 .......... H04W 72/566
(Continued)

OTHER PUBLICATIONS

"New WID: MIMO Evolution for Downlink and Uplink", 3GPP TSG RAN Meeting #94e, RP-213598, Agenda Item: 8A.1, Samsung, Dec. 6-17, 2021, 6 pages.
(Continued)

*Primary Examiner* — Eric Nowlin
(74) *Attorney, Agent, or Firm* — Lippes Mathias LLP

(57) ABSTRACT
Systems, methods, apparatuses, and computer program products for dynamic uplink transmission scheme indication for multi-panel user equipment are provided. For example, a method can include indicating to a network a capability of an apparatus to support simultaneous multi-panel transmission to the network. The method can also include receiving a configuration of two sounding reference signal resource sets for codebook based physical uplink shared channel and a three-bit sounding reference signal resource set indicator for the simultaneous multi-panel transmission over the physical uplink shared channel.

16 Claims, 5 Drawing Sheets

| Codepoint | SRS resource set(s) | SRI/TPMI field(s) |
|---|---|---|
| 00 | S-TRP mode with 1st SRS resource set (TRP1) | 1st SRI/TPMI field (2nd field is unused) |
| 01 | S-TRP mode with 2nd SRS resource set (TRP2) | 1st SRI/TPMI field (2nd field is unused) |
| 10 | M-TRP mode with (TRP1, TRP2 order): <br>-1st SRI/TPMI field: 1st SRS resource set <br>-2nd SRI/TPMI field: 2nd SRS resource set | Both 1st and 2nd SRI/TPMI fields |
| 11 | M-TRP mode with (TRP2, TRP1 order): <br>-1st SRI/TPMI field: 1st SRS resource set <br>-2nd SRI/TPMI field: 2nd SRS resource set | Both 1st and 2nd SRI/TPMI fields |

(56) References Cited

U.S. PATENT DOCUMENTS

| | | | |
|---|---|---|---|
| 2021/0329624 A1* | 10/2021 | Huang | H04L 5/0051 |
| 2022/0295299 A1* | 9/2022 | Park | H04W 72/23 |
| 2023/0023982 A1* | 1/2023 | Kim | H04W 52/0216 |
| 2023/0063015 A1* | 3/2023 | Muruganathan | H04L 5/0091 |
| 2023/0076139 A1* | 3/2023 | Muruganathan | H04W 16/28 |
| 2023/0156726 A1* | 5/2023 | Khoshnevisan | H04W 72/1268 370/329 |
| 2023/0354310 A1* | 11/2023 | Huang | H04L 5/0053 |
| 2024/0064527 A1* | 2/2024 | Matsumura | H04W 72/21 |
| 2024/0405943 A1* | 12/2024 | Chen | H04B 7/0697 |
| 2024/0429986 A1* | 12/2024 | Bai | H04L 1/1896 |
| 2025/0070932 A1* | 2/2025 | Chen | H04L 5/0094 |
| 2025/0253995 A1* | 8/2025 | Fakoorian | H04L 5/0094 |
| 2025/0294547 A1* | 9/2025 | Sun | H04B 7/0408 |

FOREIGN PATENT DOCUMENTS

| | | | | |
|---|---|---|---|---|
| CN | 118784193 A | * | 10/2024 | H04W 72/566 |
| CN | 119054249 A | * | 11/2024 | H04L 5/0051 |
| CN | 119096643 A | * | 12/2024 | H04W 8/08 |
| CN | 119698809 A | * | 3/2025 | H04B 7/0456 |
| CN | 120153620 A | * | 6/2025 | H04L 5/0023 |
| KR | 20240167694 A | * | 11/2024 | H04W 8/08 |
| WO | WO-2021161272 A1 | * | 8/2021 | H04L 1/189 |
| WO | WO-2022040198 A1 | * | 2/2022 | H04L 5/0076 |
| WO | 2022/149274 A1 | | 7/2022 | |
| WO | WO-2023031709 A1 | * | 3/2023 | H04W 72/1268 |
| WO | WO-2023206387 A1 | * | 11/2023 | H04W 72/1263 |
| WO | WO-2023206478 A1 | * | 11/2023 | H04W 8/08 |
| WO | WO-2023211591 A1 | * | 11/2023 | H04L 5/0048 |
| WO | WO-2024097830 A1 | * | 5/2024 | H04B 7/0639 |
| WO | WO-2024097841 A1 | * | 5/2024 | H04L 5/0023 |

OTHER PUBLICATIONS

"3rd Generation Partnership Project; Technical Specification Group Radio Access Network; NR; Multiplexing and channel coding (Release 17)", 3GPP TS 38.212, V17.2.0, Jun. 2022, pp. 1-201.

"3rd Generation Partnership Project; Technical Specification Group Radio Access Network; NR; Physical layer procedures for data (Release 17)", 3GPP TS 38.214, V17.2.0, Jun. 2022, pp. 1-228.

Partial European Search Report received for corresponding European Patent Application No. 23193096.7, dated Jan. 30, 2024, 11 pages.

Extended European Search Report received for corresponding European Patent Application No. 23193096.7, dated Apr. 23, 2024, 11 pages.

* cited by examiner

| Codepoint | SRS resource set(s) | SRI/TPMI field(s) |
|---|---|---|
| 00 | S-TRP mode with 1st SRS resource set (TRP1) | 1st SRI/TPMI field (2nd field is unused) |
| 01 | S-TRP mode with 2nd SRS resource set (TRP2) | 1st SRI/TPMI field (2nd field is unused) |
| 10 | M-TRP mode with (TRP1, TRP2 order):<br>-1st SRI/TPMI field: 1st SRS resource set<br>-2nd SRI/TPMI field: 2nd SRS resource set | Both 1st and 2nd SRI/TPMI fields |
| 11 | M-TRP mode with (TRP2, TRP1 order):<br>-1st SRI/TPMI field: 1st SRS resource set<br>-2nd SRI/TPMI field: 2nd SRS resource set | Both 1st and 2nd SRI/TPMI fields |

FIG. 1

7.3.1.1.2 Format 0_1

...

- SRS resource set indicator - 0 or 2 bits

- 2 bits according to Table 7.3.1.2.36 if

- *txConfig - namCodeBook*, and there are two SRS resource sets configured by *srs-ResourceSetToAddModList* and associated with the usage of value '*nonCodeBook*', or

- *txConfig - codebook*, and there are two SRS resource sets configured by *srs-ResourceSetToAddModList* and associated with usage of value '*codebook*';

- 0 bit otherwise.

...

| Bit field mapped to index | SRS resource set indication |
| --- | --- |
| 0 | SRS resource indicator field and Precoding information and number of layers field are associated with the first SRS resource set: Second SRS resource indicator field and second Precoding information field are reserved. |
| 1 | SRS resource indicator field and Precoding information and number of layers field are associated with the second SRS resource set: Second SRS resource indicator field and second Precoding information field are reserved. |
| 2 | SRS resource indicator field and Precoding information and number of layers field are associated with the first SRS resource set: Second SRS resource indicator field and Second Precoding information field are associated with the second SRS resource set. |
| 3 | SRS resource indicator field and Precoding information and number of layers field are associated with the first SRS resource set: Second SRS resource indicator field and Second Precoding information field are associated with the second SRS resource set. |

NOTE 1: The first and the second SRS resource sets are respectively the ones with lower and higher *srsResourceSetId* of the two SRS resources sets configured by higher layer parameter *srs-ResourceSetToAddModList* or *srs-ResourceSetToAddModListDCI-0-2*, and associated with the higher layer parameter usage of value '*nonCodeBook*' if *txConfig=nonCodebook* or '*codebook*' if *txConfig=codebook*. When only on SRS resource set is configured by higher layer parameter *srs-ResourceSetToAddModList* or *srs-ResourceSetToAddModListDCI-0-2*, and associated with the higher layer parameter usage of value '*codebook*' or '*nonCodeBook*' respectively, the first SRS resource set is the SRS resource set. The association of the first and second SRS resource sets to PUSCH repetitions for each bit field index value is as defined in Clause 6.1.2.1 of (6, TS 38.214).

NOTE 2: For DCI format 0_2, the first and second SRS resource sets configured by higher layer parameter *srs-ResourceSetToAddModListDCI-0-2* are composed of the first *SRS resources* together with other configurations in the first and second SRS resource sets configured by higher layer parameter *srs-ResourceSetToAddModList*, if any, and associated with the higher layer parameter usage of value '*codeBook*' or '*nonCodeBook*', respectively, except for the higher layer parameters '*srs-ResourceSetId*' and '*srs-ResourceIdList*'

FIG. 2

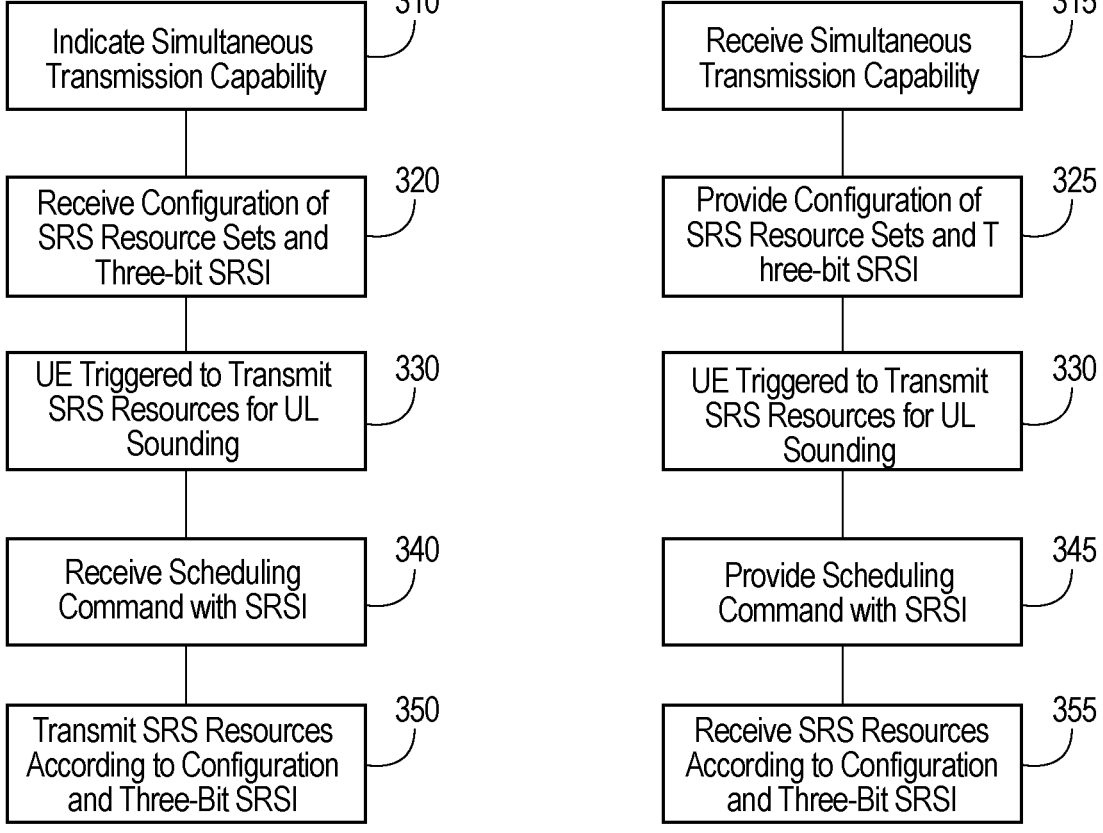
FIG. 3A                    FIG. 3B

FIG. 4

| Bit field mapped to index | SRS resource set indication | Transmission scheme |
|---|---|---|
| 0 | SRS resource indicator field and Precoding information and number of layers field are associated with the first SRS resource set; Second SRS resource indicator field and Second Precoding information field are reserved. | Rel17 PUSCH repetition |
| 1 | SRS resource indicator field and Precoding information and number of layers field are associated with the second SRS resource set; Second SRS resource indicator field and Second Precoding information field are reserved. | Rel17 PUSCH repetition |
| 2 | SRS resource indicator field and Precoding information and number of layers field are associated with the first SRS resource set; Second SRS resource indicator field and Second Precoding information field are associated with the second SRS resource set. | Rel17 PUSCH repetition |
| 3 | SRS resource indicator field and Precoding information and number of layers field are associated with the first SRS resource set; Second SRS resource indicator field and Second Precoding information field are associated with the second SRS resource set. | Rel17 PUSCH repetition |
| 4 | First SRS resource indicator field and Precoding information and number of layers field are associated with the first SRS resource set; Second SRS resource indicator field and Second Precoding information field are associated with the second SRS resource set. | Rel18 SDM |
| 5 | First SRS resource indicator field is associated with the first SRS resource set; Second SRS resource indicator field is associated with the second SRS resource set. Precoding information and number of layers field are common to both SRS resource sets | Rel18 SFN |
| 6 | SRS resource indicator field and Precoding information and number of layers field are associated with the first SRS resource set; Second SRS resource indicator field and Second Precoding information field are associated with the second SRS resource set | Rel18 FDM-B |
| 7 | SRS resource indicator field and Precoding information and number of layers field are associated with the first SRS resource set; Second SRS resource indicator field and Second Precoding information field are associated with the second SRS resource set. | Rel18 SDM repetition |

DYNAMIC UPLINK TRANSMISSION SCHEME INDICATION FOR MULTI-PANEL USER EQUIPMENT

RELATED APPLICATION

This application claims priority to U.S. Provisional application No. 63/400,621, filed on Aug. 24, 2022, and entitled "DYNAMIC UPLINK TRANSMISSION SCHEME INDICATION FOR MULTI-PANEL USER EQUIPMENT," the content of which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to dynamic uplink transmission scheme indication for multi-panel user equipment.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus can include at least one processor and at least memory instructions. The instructions, when executed by the at least one processor, cause the apparatus at least to indicate to a network a capability of the apparatus to support simultaneous multi-panel transmission to the network. The instructions, when executed by the at least one processor, also cause the apparatus at least to receive a configuration of two sounding reference signal resource sets for a physical uplink shared channel and a three-bit sounding reference signal resource set indicator for the simultaneous multi-panel transmission over the physical uplink shared channel.

An embodiment may be directed to an apparatus. The apparatus can include at least one processor and at least memory instructions. The instructions, when executed by the at least one processor, cause the apparatus at least to receive an indication of a capability of a user equipment to support simultaneous multi-panel transmission from the user equipment. The instructions, when executed by the at least one processor, also cause the apparatus at least to configure the user equipment with two sounding reference signal resource sets for a physical uplink shared channel and a three-bit sounding reference signal resource set indicator for the simultaneous multi-panel transmission over the physical uplink shared channel.

An embodiment may be directed to a method. The method can include indicating, by a user equipment to a network, a capability of the user equipment to support simultaneous multi-panel transmission to the network. The method can also include receiving a configuration of two sounding reference signal resource sets for a physical uplink shared channel and a three-bit sounding reference signal resource set indicator for the simultaneous multi-panel transmission over the physical uplink shared channel.

An embodiment may be directed to a method. The method can include receiving an indication of a capability of a user equipment to support simultaneous multi-panel transmission from the user equipment. The method can also include configuring the user equipment with two sounding reference signal resource sets for a physical uplink shared channel and a three-bit sounding reference signal resource set indicator for the simultaneous multi-panel transmission over the physical uplink shared channel.

An embodiment can be directed to an apparatus. The apparatus can include means for indicating to a network a capability of the apparatus to support simultaneous multi-panel transmission to the network. The apparatus can also include means for receiving a configuration of two sounding reference signal resource sets for a physical uplink shared channel and a three-bit sounding reference signal resource set indicator for the simultaneous multi-panel transmission over the physical uplink shared channel.

An embodiment can be directed to an apparatus. The apparatus can include means for receiving an indication of a capability of a user equipment to support simultaneous multi-panel transmission from the user equipment. The apparatus can also include means for configuring the user equipment with two sounding reference signal resource sets for a physical uplink shared channel and a three-bit sounding reference signal resource set indicator for the simultaneous multi-panel transmission over the physical uplink shared channel.

BRIEF DESCRIPTION OF THE DRAWINGS

For proper understanding of example embodiments, reference should be made to the accompanying drawings, wherein:

FIG. 1 illustrates a table of sounding reference signal resource set indicator field codepoint values and interpretations;

FIG. 2 illustrates downlink control information format 0_1, as described in 3GPP technical specification 38.212, 7.3.1.1.2;

FIG. 3A illustrates a method according to certain embodiments;

FIG. 3B illustrates a further method according to certain embodiments;

FIG. 4 illustrates a bit field mapping to index for downlink control information, according to certain embodiments.

DETAILED DESCRIPTION

Figure 5:
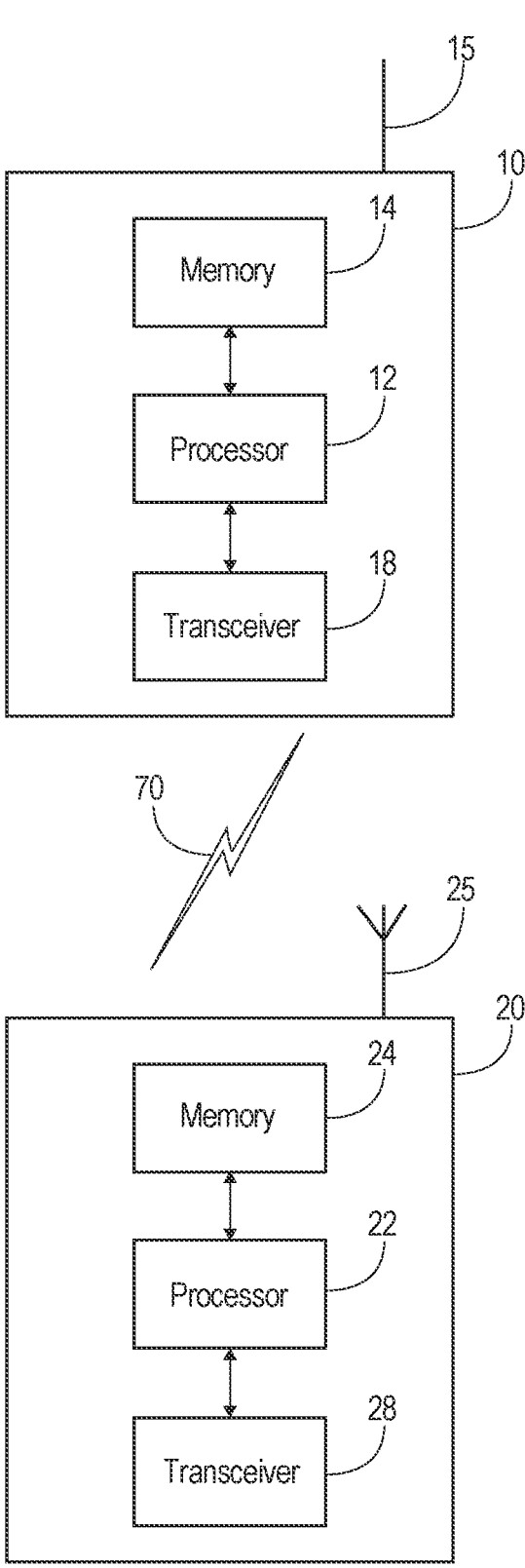
FIG. 5 illustrates an example block diagram of a system, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing dynamic uplink transmission scheme indication for multi-panel user equipment, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to third generation partnership (3GPP) new radio (NR) physical layer. For example, certain embodiments relate to facilitating simultaneous uplink (UL) transmission for multiple-panel user equipment (MP-UEs). MP-UE can be equipped with multiple antenna panels where each panel may have multiple antenna elements. Depending on UE capability, a set of UE antenna panels or panels can be simultaneously used for transmission and reception. Furthermore, different panels may have different characteristics and capabilities in terms of number of antenna ports or number of antenna elements, for example. For example, certain embodiments may facilitate simultaneous UL transmission for MP-UEs for higher UL throughput and reliability. Certain embodiments may be applicable to frequency range 2 (FR2) and multi-transmission reception point (TRP) cases, assuming up to two TRPs and up two panels. Moreover, certain embodiments may relate to multi-TRP time division multiplex (TDM) physical uplink shared channel (PUSCH) repetition.

There may be an UL precoding indication for PUSCH, where no new codebook is introduced for multi-panel simultaneous transmission. The total number of layers may be up to four across all panels and total number of codewords may be up to two across all panels, considering single downlink control information (DCI) and multi-DCI based multi-TRP operation. There can be an UL beam indication for physical uplink control channel (PUCCH)/PUSCH, where unified transmission configuration indicator (TCI) framework extension in objective assumed, considering single DCI and multi-DCI based multi-TRP operation. For the case of multi-DCI based multi-TRP operation, only PUSCH+PUSCH or PUCCH+PUCCH may be transmitted across two panels in a same component carrier (CC).

Two sounding reference signal (SRS) resource sets can be configured, having the same number of SRS resources in each set. For codebook-based mode there can be two SRS resource indicator (SRI) fields, two fields for precoding information and number of layers. For noncodebook-based mode there can be two SRI fields. The second may not indicate the number of layers in either codebook-based mode or noncodebook-based mode. There may be the same number of layers per TRP. For example, there may be the same number of layers for all the PUSCH repetitions. Either cyclical or sequential mapping can be configured via radio resource control (RRC) for mapping two SRIs to PUSCH repetitions. Nominal PUSCH repetitions may be used for the mapping for PUSCH repetition Type B.

A 2-bit DCI field, known as an SRS resource set indicator (SRSI) field, may allow dynamic switching between single-TRP and multi-TRP PUSCH operations, and dynamic change of TRP order. FIG. 1 illustrates a table show a way that the 2-bit DCI field can be indicate various SRS resource set(s) and how SRI/TPMI field(s) can be used in those cases. Thus, FIG. 1 illustrates a table of sounding reference signal resource set indicator field codepoint values and interpretations.

Transmission schemes for simultaneous uplink multi-panel, for example two panel, can be categorized as follows: spatial domain multiplexing (SDM) scheme; system frame number (SFN)-based transmission, which may be single frequency transmission; spatial domain repetition; frequency division multiplexing (FDM)-based scheme; and coherent joint transmission (CJT) scheme. Simultaneous two-panel PUSCH transmission schemes can including the following: an SDM scheme in which different layers/demodulation reference signal (DMRS) ports of one PUSCH may be separately precoded and transmitted from different UE panels simultaneously; an FDM-B scheme in which two PDSCH repetitions with same/different redundancy version (RV) of the same transport block (TB) may be transmitted from different UE panels on non-overlapped frequency domain resources; an SFN-based transmission scheme in which the same PUSCH/DMRS may be transmitted from two UE panels with different TCI states; a spatial domain repetition scheme in which two PDSCH transmission occasions with different RV of the same TB may be transmitted from two different UE panels; and an FDM-A scheme, in which different parts of the frequency domain resource of one PUSCH transmission occasion may be transmitted from different UE panels.

New transmission schemes may be added to the above-described PUSCH transmission schemes, such as single-shot and repeated PUSCH and PUSCH repetition with beam diversity. There may be a need to provide dynamic switching between different transmission schemes. Release 17 (Rel-17) PUSCH repetition with beam diversity can be viewed as a starting point.

More particularly, there may be an enhancement of SRS resource set configuration and SRI or transmitted precoding matrix indicator (TPMI) indication for single-DCI based single transmission across multiple panels (STxMP). For a PUSCH scheme there may the configuration of two SRS resource sets, an SRS resource set indicator (SRSI) field, two SRI fields, and two TPMI fields of Rel-17 mTRP PUSCH TDM repetition. There may be dynamic switching through DCI. Certain embodiments may facilitate dynamic switch through DCI.

3GPP technical specification (TS) 38.212 defines DCI formats for UL scheduling. DCI formats 0_1 and 0_2 are so called full mode DCI formats for UL to facilitate both codebook and non-codebook based multi antenna or multi-panel transmissions. FIG. 2 illustrates downlink control information format 0_1, as described in 3GPP technical specification 38.212, 7.3.1.1.2. FIG. 2 provides an excerpt from the DCI format 0_1 standard that shows the details of an SRS resource set indicator used to facilitate PUSCH time domain repetition. DCI format 02 may have the same details as to the SRS resource set indicator used to facilitate PUSCH time domain repetition.

FIG. 3A illustrates a method according to certain embodiments. The method of FIG. 3A may be performed by, for example, a user equipment. The user equipment may include at least one processor as discussed below, and at least one memory storing instructions that, when executed by the at least one processor, cause the user equipment at least to perform the method.

As shown in FIG. 3A, at 310, the user equipment can indicate to the network a capability of the user equipment to support simultaneous multi-panel transmission to the network or otherwise to perform simultaneous transmission. The UE can signal capability for simultaneous transmission, which may include an identification of one or more of SDM, FDM-B, SFN, or the like.

At 320, the user equipment can receive a configuration of at least two sounding reference signal resource sets for a physical uplink shared channel and a three-bit sounding reference signal resource set indicator for the simultaneous multi-panel transmission over the physical uplink shared channel. The physical uplink shared channel can be codebook based. The UE may receive configuration of two SRS resource sets for codebook based PUSCH and a three-bit SRS resource set indicator (SRSI) field, together with other uplink PUSCH related parameters.

At 320, alternatively the user equipment can receive a configuration of at least two sounding reference signal resource sets for codebook based physical uplink shared channel and a two-bit sounding reference signal resource set indicator. The UE may receive configuration of two SRS resource sets for codebook based PUSCH and a two-bit transmission mode indicator (TMI) field, together with other uplink PUSCH related parameters. When TMI configured, there could be indices 0-3, for example. 0=SDM, 1=FDM-B, 2=SFN, and 3=FDM-A.

At 330, the UE can be triggered to transmit or use sounding reference signal resources for uplink channel sounding purposes after the configuration is received. The UE can be triggered to transmit SRS resource sets, or to use SRS resource sets for transmission, for uplink channel sounding purposes, either by itself or by network instruction.

At 340, the UE can receive a scheduling command from the network for the simultaneous multi-panel transmission over the physical uplink shared channel. The scheduling command can include the three-bit sounding reference signal resource set indicator. The UE can receive a scheduling command in DCI format 0_1 or 0_2 for the PUSCH. The SRS resource set indicator can have a variety of different values, which can be considered first through fourth index values, or index values 4, 5, 6, and 7, as shown in FIG. 4. The scheduling command can be received in a PDCCH message from the network.

A first value of the sounding reference signal resource set indicator, corresponding to index value 4 in FIG. 4, can indicate that the user equipment performs spatial domain multiplexing using two or more panels. The UE can be provided two SRIs in the DCI, two precoding information, and number of layers' information. There may be options: a single codeword can be transmitted through different layers across panels, or two codewords can be transmitted, each codeword through the layers per panel.

A second value of the sounding reference signal resource set indicator, corresponding to index value 5 in FIG. 4, can indicate that the user equipment performs single frequency network transmission using two panels. The UE can be provided two SRIs, single precoding information, and number of layers. A single codeword can be transmitted through a single layer per panel. Both panels can be transmitting the same codeword. The DMRS antenna port can be the same in both panels, in this example.

A third value of the sounding reference signal resource set indicator, corresponding to index value 6 in FIG. 4, can indicate that the user equipment performs frequency division multiplexing type B transmission using two panels. The UE can be provided two SRIs, two precoding information, and number of layers' information. There may be options, such as a single codeword may be transmitted through different layers across panels, or two codewords may be transmitted, each codeword through the layers per panel.

A fourth value of the sounding reference signal resource set indicator, corresponding to index value 7 in FIG. 4, can indicate that the user equipment performs spatial domain multiplexing repetition transmission using two panels. The UE can be provided two SRIs, single precoding information, and number of layers. A single codeword can be transmitted through a single layer or multiple layer per panel, for example two layer per panel. Both panels may be transmitting the same codeword. DMRS(s) may be the same or different in the two or more panels.

There can be variations to the above examples. For example, the fourth value or any other value can be replaced with FDM type A (FDM-A) transmission. Other schemes for simultaneous transmission are also permitted. To implement the method of FIG. 3A, the table shown in FIG. 4 can be used. FIG. 4 illustrates a bit field mapping to index for downlink control information, according to certain embodiments. The mapping of FIG. 4 can also be used with method illustrated in FIG. 3B.

FIG. 3B illustrates another method according to certain embodiments. The method of FIG. 3B may implemented by, for example, a radio access network node, such as next generation Node B (gNB) or the like.

As shown in FIG. 3B, at 315 the network can receive an indication of a capability of a user equipment to support simultaneous multi-panel transmission to the network or otherwise to perform simultaneous transmission. As noted above, the physical uplink shared channel can be codebook based. This can be the same indication indicated at 310. At 324, the network can configure the user equipment with two sounding reference signal resource sets for a physical uplink shared channel and a three-bit sounding reference signal resource set indicator for the simultaneous multi-panel transmission over the physical uplink shared channel. This can be the same configuration received at 320.

At 330, the user equipment can be triggered to transmit or use sounding reference signal resources for uplink channel sounding purposes after the user equipment is configured. This can be the same event as 330 in FIG. 3A.

At 345, the network can provide a scheduling command to the user equipment for the simultaneous multi-panel transmission over the physical uplink shared channel. This scheduling command can be the same as received at 340. The scheduling command can include the three-bit sounding reference signal resource set indicator. The values of the sounding reference signal resource set indicator can be as described above with reference to FIGS. 3A and 4. The scheduling command can be sent in a PDCCH message to the user equipment.

Thus, for single-DCI based PUSCH certain embodiments use and extend the SRS resource set indicator field to dynamically indicate the applied transmission mode in addition to indicating the order of the applied SRS resources or resource sets for various PUSCH repetition schemes. For release 18 (Rel18) UE and when the UE supports the simultaneous multi-panel uplink transmission and is configured with two SRS resource sets, the UE can be configured with a three-bit SRS resource set indicator field.

The user equipment can determine the applied multi-panel UL transmission scheme from the received SRS resource set indicator in the scheduling DCI, which may be DCI format 0_1 or 0_2, if the indicator provides index.

As shown in FIG. 4, values 0-3 can be as defined in Rel17 and shown in FIG. 2. Moreover, as shown in FIG. 4, values 4-7 can be as shown above. The configuration of the two sounding reference signal resource sets can transmitted via RRC signaling to the user equipment and received via the RRC signaling from the network. Similarly, the three-bit SRSI can be transmitted in a PDCCH message to the user equipment and received in the PDCCH from the network.

FIG. 5 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 5.

As illustrated in the example of FIG. 5, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 5, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to dynamic uplink transmission scheme indication for multi-panel user equipment.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein. The term "non-transitory," as used herein, may correspond to a limitation of the medium itself (i.e., tangible, not a signal) as opposed to a limitation on data storage persistency (e.g., RAM vs. ROM).

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-3, or any other method described herein. In some embodiments, as discussed herein, apparatus 10 may be configured to perform a procedure relating to providing dynamic uplink transmission scheme indication for multi-panel user equipment, for example.

FIG. 5 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5.

As illustrated in the example of FIG. 5, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-3, or any other method described herein. For example, in an embodiment, apparatus 20 may be controlled to perform a process relating to providing dynamic uplink transmission scheme indication for multi-panel user equipment, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may provide support for dynamic transmission mode switching/indication without significantly increasing overhead and complexity.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

DCI Downlink Control Information
DMRS Demodulation Reference Signal
FDM Frequency Domain Multiplexing
gNB 5G Node B
PUSCH Physical Uplink Shared Channel
SDM Spatial Domain Multiplexing
SFN Single Frequency Network
SRS Sounding Reference Signal
UE User Equipment

We claim:

1. An apparatus, comprising:
at least one processor; and
at least one memory storing instructions that, when executed by the at least one processor, cause the apparatus at least to:
indicate to a network a capability of the apparatus to support simultaneous multi-panel transmission to the network; and
receive a configuration of two sounding reference signal resource sets for a physical uplink shared channel and a three-bit sounding reference signal resource set indicator for the simultaneous multi-panel transmission over the physical uplink shared channel, wherein a first value of the three-bit sounding reference signal resource set indicator indicates that the apparatus performs spatial domain multiplexing using two panels for the simultaneous multi-panel transmission over the physical uplink shared channel, and wherein a third value of the three-bit sounding reference signal resource set indicator indicates that the apparatus performs frequency division multiplexing type B transmission using two panels for the simultaneous multi-panel transmission over the physical uplink shared channel.

2. The apparatus of claim 1, wherein the physical uplink shared channel is codebook-based.

3. The apparatus of claim 1, wherein the apparatus is triggered to transmit or use sounding reference signal resources for uplink channel sounding purposes after the configuration is received.

4. The apparatus of claim 1, wherein the instructions, when executed by the at least one processor, cause the apparatus at least to
receive a scheduling command from the network for the simultaneous multi-panel transmission over the physical uplink shared channel, the scheduling command comprising the three-bit sounding reference signal resource set indicator.

5. The apparatus of claim 4, wherein the scheduling command is received in a physical downlink control channel message from the network.

6. The apparatus of claim 1, wherein a second value of the three-bit sounding reference signal resource set indicator indicates that the apparatus performs single frequency network transmission using two panels for the simultaneous multi-panel transmission over the physical uplink shared channel.

7. The apparatus of claim 1, wherein a fourth value of the three-bit sounding reference signal resource set indicator indicates that the apparatus performs spatial domain multiplexing repetition transmission using two panels for the simultaneous multi-panel transmission over the physical uplink shared channel.

8. The apparatus of claim 1, wherein the configuration of the two sounding reference signal resource sets is received via radio resource control signaling from the network, and the three-bit sounding reference signal resource set indicator is received in a physical downlink control channel message from the network.

9. An apparatus, comprising:
at least one processor; and
at least one memory storing instructions that, when executed by the at least one processor, cause the apparatus at least to:

receive an indication of a capability of a user equipment to support simultaneous multi-panel transmission from the user equipment; and configure the user equipment with two sounding reference signal resource sets for a physical uplink shared channel and a three-bit sounding reference signal resource set indicator for the simultaneous multi-panel transmission over the physical uplink shared channel, wherein a first value of the three-bit sounding reference signal resource set indicator indicates that the user equipment performs spatial domain multiplexing using two panels for the simultaneous multi-panel transmission over the physical uplink shared channel, and wherein a third value of the three-bit sounding reference signal resource set indicator indicates that the user equipment performs frequency division multiplexing type B transmission using two panels for the simultaneous multi-panel transmission over the physical uplink shared channel.

10. The apparatus of claim 9, wherein the physical uplink shared channel is codebook-based.

11. The apparatus of claim 9, wherein the user equipment is triggered to transmit or use sounding reference signal resources for uplink channel sounding purposes after the user equipment is configured.

12. The apparatus of claim 9, wherein the instructions, when executed by the at least one processor, cause the apparatus at least to provide a scheduling command to the user equipment for the simultaneous multi-panel transmission over the physical uplink shared channel, the scheduling command comprising the three-bit sounding reference signal resource set indicator.

13. The apparatus of claim 12, wherein the scheduling command is transmitted in a physical downlink control channel message to the user equipment.

14. The apparatus of claim 9, wherein a second value of the three-bit sounding reference signal resource set indicator indicates that the user equipment performs single frequency network transmission using two panels for the simultaneous multi-panel transmission over the physical uplink shared channel.

15. The apparatus of claim 9, wherein a fourth value of the three-bit sounding reference signal resource set indicator indicates that the user equipment performs spatial domain multiplexing repetition transmission using two panels for the simultaneous multi-panel transmission over the physical uplink shared channel.

16. The apparatus of claim 9, wherein the instructions, when executed by the at least one processor, cause the apparatus at least to transmit, to the user equipment, the configuration of the two sounding reference signal resource sets via radio resource control signaling; and transmit, to the user equipment, the three-bit sounding reference signal resource set indicator in a physical downlink control Channel message.

* * * * *